(12) United States Patent
Berning et al.

(10) Patent No.: US 8,424,666 B2
(45) Date of Patent: Apr. 23, 2013

(54) FOLDING TRANSPORT CONVEYOR FOR A CONSTRUCTION MACHINE, AUTOMOTIVE CONSTRUCTION MACHINE, AS WELL AS METHOD FOR PIVOTING A TRANSPORT CONVEYOR

(75) Inventors: Christian Berning, Zuelpich (DE); Heinz Koetting, Neustadt/Wied (DE); Bjoern Schneider, Leubsdorf (DE); Herbert Ley, St. Katharinen (DE); Joerg Berges, Hennef (DE); Martin Lenz, Grossmaischeid (DE)

(73) Assignee: Wirtgen GmbH

( * ) Notice: Subject to any disclaimer, the term of this patent is extended or adjusted under 35 U.S.C. 154(b) by 513 days.

(21) Appl. No.: 12/424,148

(22) Filed: Apr. 15, 2009

(65) Prior Publication Data

US 2009/0267402 A1 Oct. 29, 2009

(30) Foreign Application Priority Data

Apr. 29, 2008 (DE) .......................... 10 2008 021 484

(51) Int. Cl.
*B65G 15/26* (2006.01)
(52) U.S. Cl.
USPC .......................... 198/313; 198/632; 198/861.2
(58) Field of Classification Search .................. 198/313, 198/632, 861.2, 861.3, 538
See application file for complete search history.

(56) References Cited

U.S. PATENT DOCUMENTS

| | | | |
|---|---|---|---|
| 3,362,460 A | | 1/1968 | Ligh |
| 3,799,479 A | | 3/1974 | Roeder et al. |
| 4,063,375 A | * | 12/1977 | Satterwhite ..................... 37/190 |
| 4,183,158 A | * | 1/1980 | Satterwhite ..................... 37/190 |
| 4,427,105 A | * | 1/1984 | Hawley et al. ................ 198/632 |
| 4,591,432 A | * | 5/1986 | Hartl ............................. 209/247 |
| 4,618,057 A | * | 10/1986 | Howser ..................... 198/861.2 |
| 4,723,867 A | | 2/1988 | Wirtgen |
| 4,756,402 A | * | 7/1988 | Bevins .......................... 198/632 |
| 4,775,047 A | * | 10/1988 | Grall .......................... 198/861.2 |
| 4,843,799 A | * | 7/1989 | Simelunas et al. ............. 53/448 |
| 4,923,359 A | * | 5/1990 | Petri et al. ..................... 414/523 |
| 5,086,911 A | * | 2/1992 | Douglas ........................ 198/632 |
| 5,299,674 A | * | 4/1994 | Cusitar ......................... 198/303 |
| 5,875,883 A | * | 3/1999 | Ertel et al. .................... 198/821 |
| 6,296,109 B1 | | 10/2001 | Nohl |
| 6,966,418 B2 | * | 11/2005 | Crookston ..................... 198/312 |

(Continued)

FOREIGN PATENT DOCUMENTS

| | | |
|---|---|---|
| DE | 2228395 | 12/1973 |
| DE | 2228395 A1 | 12/1973 |

(Continued)

OTHER PUBLICATIONS

Exhibit A: Search Report, European Patent Office, EP 09 15 8359, 3 pages, Aug. 27, 2009. (not prior art).

(Continued)

*Primary Examiner* — Joseph A Dillon, Jr.
(74) *Attorney, Agent, or Firm* — Waddey & Patterson, P.C.; Lucian Wayne Beavers (57) ABSTRACT

In a folding transport conveyor (2) for a construction machine (1), with a first transport conveyor section (4) articulated at the construction machine (1), a second transport conveyor section (6) articulated at the first transport conveyor section (4) in a pivoting fashion, with a conveyor belt (10) continuously revolving around both transport conveyor sections (6), and with at least one pivoting mechanism acting between the transport conveyor sections (4, 6), it is provided that the pivoting mechanism includes a cam mechanism (12).

19 Claims, 4 Drawing Sheets

U.S. PATENT DOCUMENTS 7,153,086 B2 * 12/2006 Kauppila et al. .............. 414/758
7,347,311 B2 * 3/2008 Rudge ........................... 198/313
7,472,785 B2 * 1/2009 Albright et al. ............... 198/589

FOREIGN PATENT DOCUMENTS

| | | |
|---|---|---|
| DE | 203885 | 11/1983 |
| DE | 3528038 A1 | 2/1987 |
| EP | 0731040 A1 | 9/1996 |
| EP | 1864921 A1 | 12/2007 |
| GB | 1417281 A | 12/1975 |

OTHER PUBLICATIONS

Exhibit A: European Search Report dated Aug. 27, 2009.

* cited by examiner

FOLDING TRANSPORT CONVEYOR FOR A CONSTRUCTION MACHINE, AUTOMOTIVE CONSTRUCTION MACHINE, AS WELL AS METHOD FOR PIVOTING A TRANSPORT CONVEYOR

BACKGROUND OF THE INVENTION

1. Field of the Invention

The invention relates to a folding transport conveyor for a construction machine, an automotive construction machine, as well as a method for pivoting a transport section at the end of a folding transport conveyor.

2. Description of the Prior Art

Construction machines that are provided with a transport conveyor, and in which the transport conveyor is articulated at the construction machine, can have a large space requirement in case of transport.

In order to not have to entirely remove the transport conveyor from the construction machine, it is already known to provide a folding transport conveyor which comprises a first transport conveyor section articulated at the construction machine, and a second pivotable transport conveyor section following the same. Transport conveyors of smaller size are pivoted manually. With larger transport conveyors, pivoting of the transport conveyor from a working position into a trans-port position is made possible by means of a pivoting mechanism acting between the transport sections. A conveyor belt continuously revolves around both transport conveyor sections.

According to the prior art, a pivoting mechanism is provided which includes a pivotable lever, wherein two piston-cylinder units engage with different places of the lever. One piston-cylinder unit each is articulated at one of the transport conveyor sections.

The prior art has the disadvantage of requiring a high apparatus-related effort as the pivotable transport conveyor section is not secured in its limit positions by the pivoting mechanism, and therefore requires locking devices in the limit positions.

In addition, a disadvantage is created by the fact that hydraulic feed lines to the pivotable transport conveyor section need to be provided which can easily be damaged when pivoting the folding transport conveyor into the transport position.

In an alternative prior art, the pivoting mechanism is characterized in that a piston-cylinder unit engages with the common point of articulation of two control arms, where that end of each of the control arms facing away from the common point of articulation is, in turn, connected to one of the transport conveyor sections in an articulated fashion.

The disadvantage created by this prior art is that the piston-cylinder unit coupled to the pivotable transport conveyor section is fastened at the underside of said transport conveyor section, which poses a great risk of the piston-cylinder unit being damaged as it is arranged underneath the transport conveyor in an exposed fashion.

In accordance with a further prior art, it is known to fold the pivotable transport conveyor section upwards, which at first glance offers the advantage of not requiring a locking device in the limit positions as the device is arrested there due to design reasons.

This design creates the disadvantage, however, that no mountings like, for instance, a suction system may be provided on the first transport conveyor section. In addition, the conveyor belt needs to be slackened when pivoting the transport conveyor into the transport position because the pivot point is then too far away from the continuously revolving transport belt.

SUMMARY OF THE INVENTION

It is the object of the invention to create a folding transport conveyor, an automotive construction machine, as well as a method for pivoting a transport conveyor section which is simplified in its design and requires no additional locking means for the transport conveyor.

According to one embodiment of the invention, it is advantageously provided that the pivoting mechanism includes a cam mechanism. Providing a cam mechanism enables the pivoting mechanism to carry out the complete pivoting operation of approximately 180° by means of one single driving device.

In addition, the cam mechanism enables detent positions to be provided in the limit positions by way of a corresponding curvature, so that the pivotable transport conveyor section can be retained in the limit positions in a self-locking fashion without requiring additional locking means.

It is preferably provided that the cam mechanism comprises a control cam which interacts with a coupling element, wherein the control cam is arranged at one of the transport conveyor sections, and the coupling element is mounted at the other transport conveyor section.

In this arrangement, the control cam may be arranged at one of the transport conveyor sections in a permanent fashion, and the coupling element may be mounted at the other transport conveyor section in a pivoting fashion.

The control cam is preferably arranged at the second transport conveyor section in a permanent fashion, and the coupling element is mounted at the first transport conveyor section in a pivoting fashion along a trajectory. In this arrangement, the trajectory may be of a circular nature, preferably a circular path.

In a preferred embodiment, it is provided that the pivoting mechanism comprises an actuating device and a pivoting lever which is actuated by the said actuating device.

The pivoting lever comprises a first lever arm and a second lever arm projecting from the first lever arm at an angle, wherein the pivoting lever, upon actuation of the actuating device, pivots the second transport conveyor section via the cam mechanism.

It is of particular advantage in this design that the drive unit can be attached to the transport conveyor section articulated at the construction machine, while the cam mechanism is arranged at the pivotable transport section in a permanent fashion. As a result, it is not necessary to transfer feed lines for the driving device to the pivotable transport conveyor section.

It is preferably provided that the pivoting lever, upon actuation of the actuating device, acts on the control cam of the cam mechanism for controlling the pivoting movement of the second transport conveyor section. Upon actuation of the actuating device, the pivoting lever can carry out the pivoting movement of the pivotable transport conveyor section completely across the overall pivoting angle provided of approximately 180°.

A preferred embodiment provides that the control cam is incorporated in a control plate. The coupling element is arranged at the free end of the pivoting lever. The pivoting lever may be mounted, with the free end of the first lever arm, at the free end of the first transport conveyor section, with the actuating device engaging at the bifurcation point between the first and the second lever arm in an articulated fashion.

The second lever arm comprises, at its free end, the coupling element that is engaged with the control cam of the cam mechanism.

The control cam comprises different cam sections wherein the control cam, in the limit positions of the pivotable second transport conveyor section, comprises detent positions in which the second transport conveyor section is retained in a self-locking fashion.

It is preferably provided that the control cam comprises a first cam section for retaining, in a self-locking fashion, the second transport conveyor section in the working position, a second cam section following the first cam section for lowering the second transport conveyor section, a third cam section following the second cam section for moving the second transport conveyor section into the transport position, and a fourth cam section following the third cam section for retaining, in a self-locking fashion, the second transport conveyor section in the transport position.

In this arrangement, it is provided that the cam sections of the control cam comprise one alignment each in the working position and transport position of the second transport conveyor section which, in combination with the coupling element of the pivoting lever, forms a detent position without locking means which can only be left again upon actuation of the actuating device.

It is preferably provided that the control cam is designed in such a manner that the forces in the piston-cylinder unit are minimized across the entire pivoting range. This can be effected by the lever arms of the pivoting lever projecting from one another at an angle of less than 90°, and/or the lever arm coupled with the second transport conveyor section being longer than the lever arm coupled with the first transport conveyor section, and is preferably more than twice as long.

The ends of the first and second lever arm facing away from the actuating device may be connected to one another wherein the pivoting lever may include a plate or of control arms connected to one another in a preferably triangular shape.

Two pivoting mechanisms arranged in pairs and operated synchronously are preferably arranged at the sides next to the transport conveyor sections. In a preferred embodiment, parts of the pivoting mechanism corresponding to one another may be connected to one another by means of bridging elements in order to improve the synchronous operation and/or to create a stiffening effect. To this end, the part pairs of the pivoting mechanisms on both sides, arranged in pairs next to one another, may be connected to one another by cross struts. In addition, the support rollers forming the coupling element may be provided with a common axle and can thus also reinforce the structure of the cam mechanism.

The method for pivoting a second transport conveyor section articulated at a first transport conveyor section is characterized by exerting an actuating force on a coupling element coupled to one transport conveyor section, or on a control cam element coupled to the other transport conveyor section, with the coupling element being engaged with the control cam element in order to create the pivoting movement of the second transport conveyor section.

In this arrangement, the control cam element or the coupling element may be attached to one of the transport conveyor sections in a permanent fashion, and the complementary element may be mounted at the other transport conveyor section in a pivoting fashion.

The element mounted in a pivoting fashion is preferably moved on a circular path.

In the following, one embodiment of the invention is explained in more detail with reference to the drawings.

DETAILED DESCRIPTION OF THE PREFERRED EMBODIMENT

Figure 1:
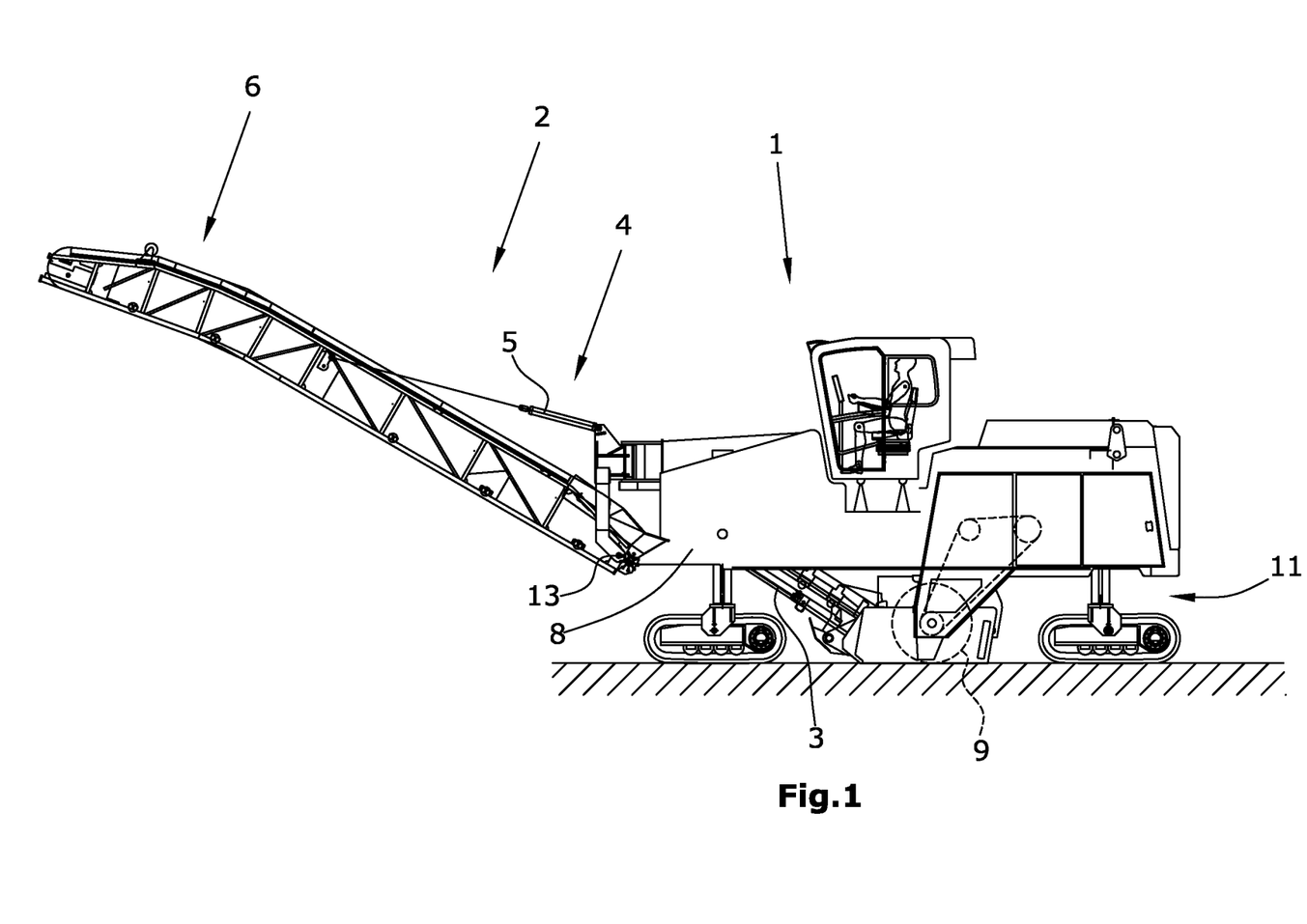
FIG. 1 is a side elevation view of a road construction machine with a transport conveyor.

FIG. 1 shows a road milling machine for milling ground surfaces or traffic surfaces in the embodiment of a front-loading road milling machine. The road milling machine 1 comprises a chassis 11 with, for example, four crawler track units, which carries the machine frame 8 of the road milling machine 1. It is understood that the crawler track units may be substituted wholly or in part by wheel units. A milling drum 9, which extends transversely to the direction of travel, is mounted in the machine frame 8. The milling depth is preferably set by means of the height adjustment of the crawler track units via lifting columns. The road milling machine 1 depicted in FIG. 1 is also called a front-loading road milling machine as it is capable of conveying the milled material towards the front when seen in the direction of travel onto a transport vehicle. A first transport device, consisting of a transport conveyor 3, is arranged in front of the milling drum 9 when seen in the direction of travel, which preferably transfers the milled material to a second transport device including a folding transport conveyor 2. It is understood that the road milling machine 1 may also be provided with one single transport conveyor 2 only which may also be arranged at the rear of the machine.

The road milling machine depicted in FIG. 1 shows a typical embodiment of a construction machine in which a folding transport conveyor can be used.

The folding transport conveyor 2 is generally also suitable for use with other construction machines in which a transport of material takes place and where there is an interest to reduce the design length of the machine for transport purposes.

The road milling machine 1 depicted in FIG. 1 is a cold milling machine which can mainly be used for the milling of road surfaces. The material worked off by a milling drum 9 is transported, via a first transport conveyor 3 existing in the machine, from a drum housing surrounding the milling drum 9 to the front end of the machine frame 8 of the machine, and there is transferred to a second transport conveyor 2 which can be folded for transport purposes in order to shorten the length of the machine 1.

Said folding transport conveyor 2 comprises a first transport conveyor section 4 articulated at the machine frame 8 of the construction machine 1 in a pivoting fashion, and a second transport conveyor section 6 articulated at the first transport conveyor section 4 in a pivoting fashion. A continuously revolving conveyor belt 10 is guided around both transport conveyor sections 4, 6. The pivotable transport conveyor 2 can be both pivoted about a ground-parallel axis 13 in order to alter the height setting of the transport conveyor 2, and slewed about a vertical axis in order to enable the material to be transported to a truck standing at the side next to the milling cut. The pivotable second transport section 6 is pivotable about a ground-parallel axis only about an articulation 26. A pulling device 5 may be used, for instance, for height adjustment, said pulling device 5 being articulated at the machine frame 8 on the one hand and being attached to the first transport conveyor section 4 on the other hand.

A pivoting mechanism is arranged between the transport conveyor sections 4, 6, which includes a cam mechanism 12.

Figure 2:
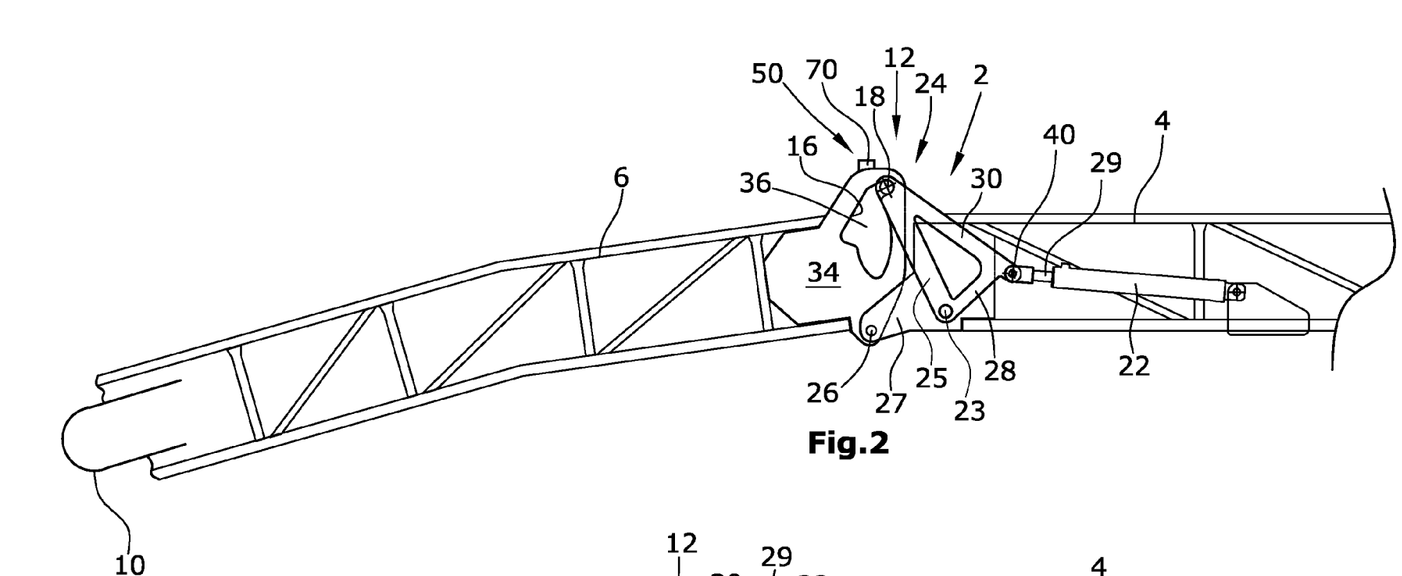
FIG. 2 is a partial side view of a folding transport conveyor shown in the side view in working position.
Figure 4:
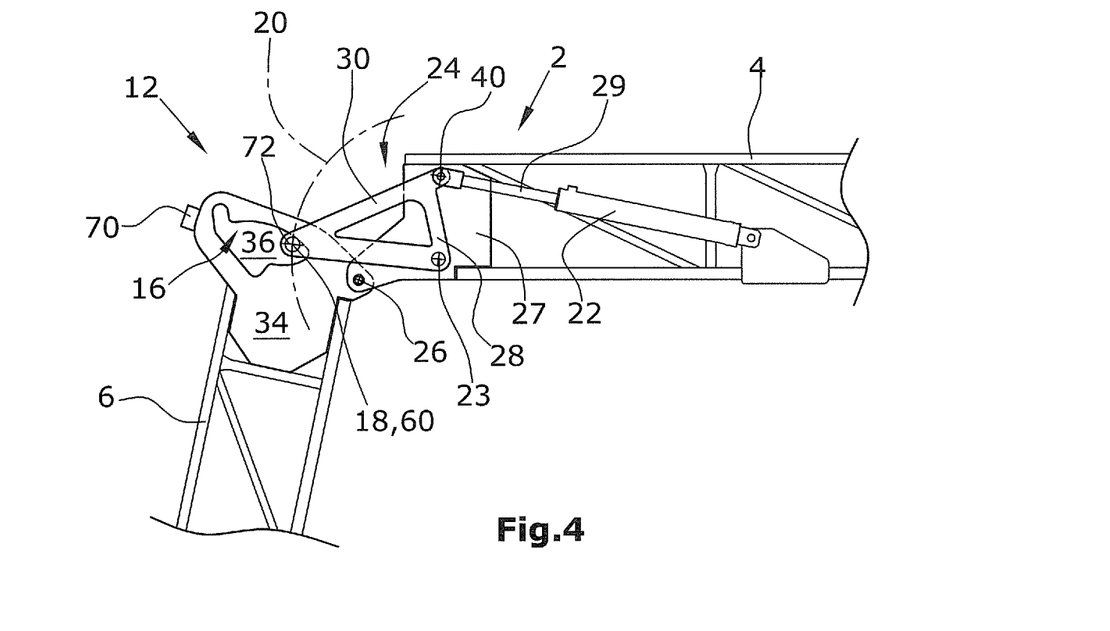
FIG. 4 is a side view of the transport conveyor of FIG. 2 with a front trans-port conveyor section pivoted about approximately 70°.

FIG. 2 shows the transport conveyor 2 in working position. The transport conveyor section 4 articulated at the construction machine 1 is connected to the second transport conveyor section 6 in an articulated fashion via a pivot articulation 26 with ground-parallel axis, said pivot articulation 26 being mounted in a side plate 27 of the transport conveyor section 4, so that the second transport conveyor section 6 is pivotable about said articulation 26 from the working position into the transport position, as is shown in FIG. 4.

The folding transport conveyor 2 comprises a pivoting mechanism in the form of a cam mechanism 12 which acts between the first and second transport conveyor sections 4, 6 and controls the pivoting movement about the articulation 26. For this purpose, an actuating device 22, which preferably comprises a piston-cylinder unit, is preferably arranged at the first transport conveyor section 4, the piston rod 29 of said piston-cylinder unit being coupled to a pivoting lever 24 in an articulated fashion at an articulation 40 of the pivoting lever 24.

The pivoting lever 24 comprises at least a first lever arm 28, as well as a second lever arm 30, which project from one another at a fixed angle in the manner of a two-armed lever, and preferably at an angle of somewhat less than 90°.

The first lever arm 28 is mounted at the first transport conveyor section 4, near its free end, in an articulation 23 in the side plate 27 having its axis parallel to the ground, with the other end of the first lever arm 28 being connected to the piston rod 29 of the piston-cylinder unit 22 in an articulated fashion.

The second lever arm 30 is, on the one hand, also articulated at the piston rod 29 of the piston-cylinder unit 22, and comprises a coupling element 18 at its other end which is engaged with a control cam 16 of the cam mechanism 12. During movement of the coupling element 18, the transport conveyor section 6 is pivoted by means of the control cam 16, with the control cam 16 resting against the coupling element 18 at all times.

Figure 5:
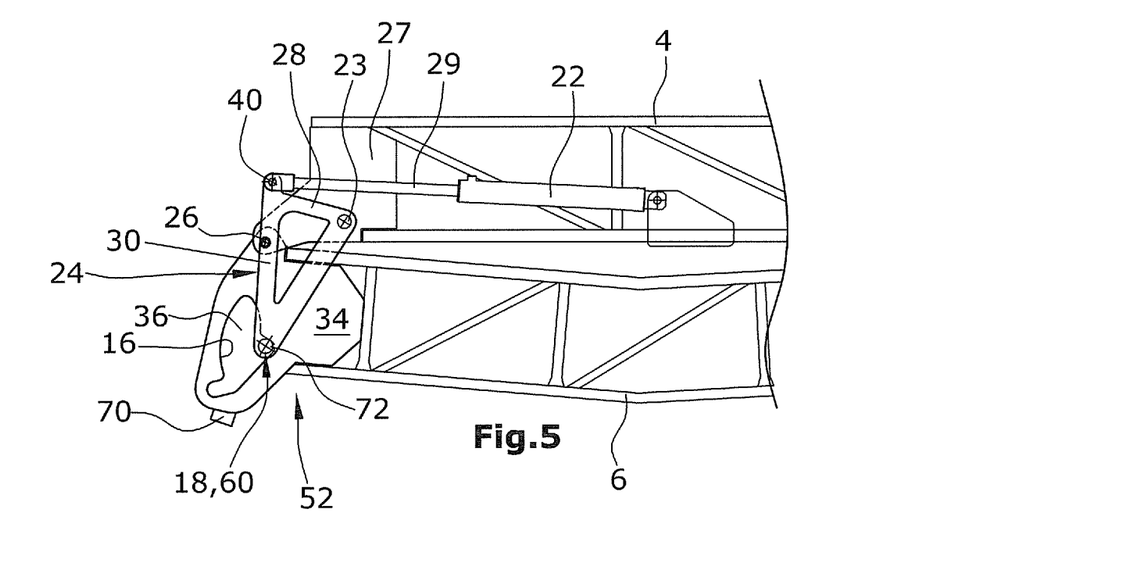
FIG. 5 is a side view of the folding transport conveyor of FIG. 2 in transport position.

For the purpose of stiffening the pivoting lever 24, the same may include a plate, or struts arranged in a triangular shape, as can be seen from FIG. 2. The coupling element 18, which includes the support roller 60 mounted in a rotating fashion, is arranged in the vertex of the acute-angled triangle formed by the struts. The support roller 60 is moved via the piston-cylinder unit 22 and the pivoting lever 24, and presses on the control cam 16 of the cam mechanism 12, by way of which a force is exerted on the second transport conveyor section 6 articulated in a pivoting fashion. When the piston rod 29 of the piston-cylinder unit 22 is moved forward, the support roller 60 leaves the detent position 50 in a first cam section 42 of the control cam 16, apparent in FIG. 6, and moves along a second cam section 44, by way of which the second transport conveyor section 6 is lowered. In the area of the third cam section 46 of the control cam 16, the second transport conveyor section 6 is pressed down below the first transport conveyor section 4, with the support roller 60, in the transport position shown in FIG. 5, being in the second detent position 52 in the fourth cam section 48 of the control cam 16.

Figure 6:
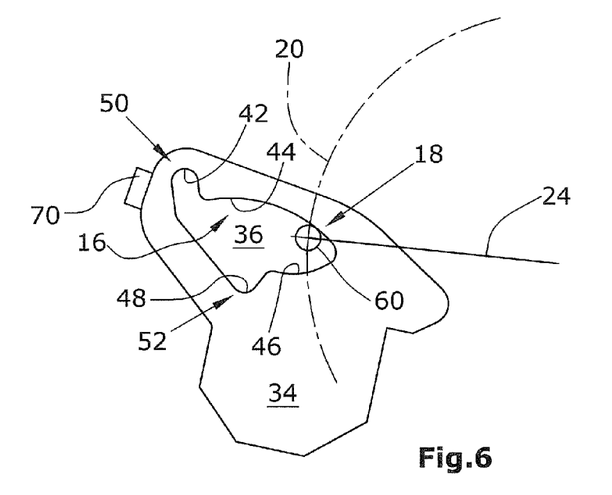
FIG. 6 shows the control plate of the cam mechanism.

In the respective detent positions 50 and 52, the second transport conveyor section 6 is retained in a self-locking fashion so that no additional locking means are required in order to retain the pivotable transport conveyor section 6 in its limit positions. The transport conveyor remains in the respective detent position even when the piston-cylinder unit 22 is depressurized or even removed.

As a result, the pivotable transport conveyor section 6 is capable of carrying out a pivoting movement of approx. 180° by means of the cam mechanism 12.

In this arrangement, the support roller 60 moves around the articulation 23 on a circular trajectory 20 shown in FIG. 6. The first lever arm 28 is preferably shorter than the second lever arm 30, wherein the latter may have twice or three times the length of the first lever arm 28.

The cam mechanism 12 comprises a control plate 34 in which the control cam 16 is designed in the shape of a cut-out 36. The control plate 34 is connected to the second transport conveyor section 6 in a permanent fashion, namely preferably welded to the struts of the second transport conveyor section 6.

Figure 3:
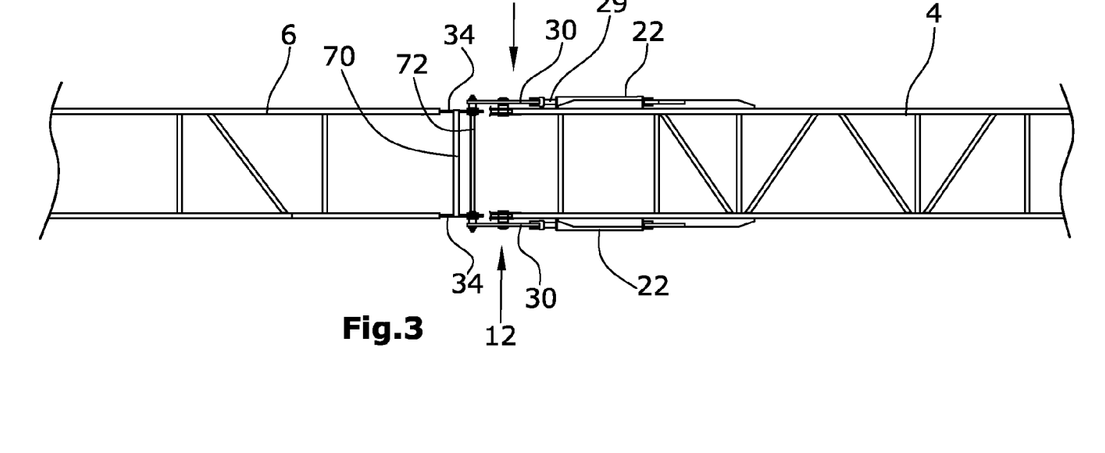
FIG. 3 is a schematic top view of the transport conveyor of FIG. 2 without conveyor belt.
Figure 7:
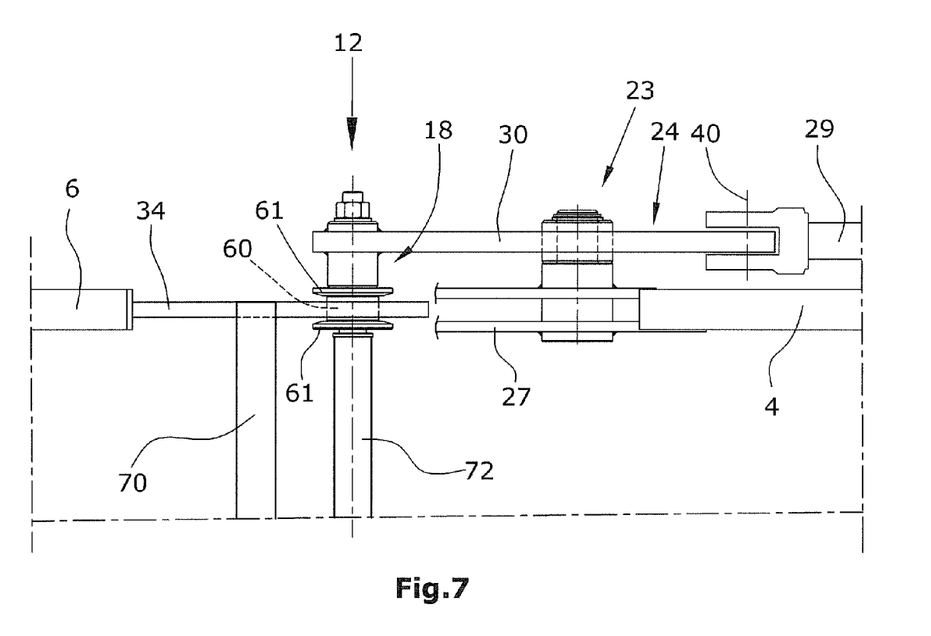
FIG. 7 is an enlarged top view of the cam mechanism of the transport conveyor of FIG. 2.

As can best be seen from FIGS. 3 and 7, preferably two cam mechanisms 12 actuated synchronously by two actuating devices 22 are arranged on both sides of the transport conveyor sections 4, 6. In this arrangement, at least one cross strut 70 represents a bridging between the control plates 34 of the left side and the right side, which creates a stiffening of the control plates 34. A comparable bridging between the coupling elements 18 of the left side and the right side is realized by an axle 72 which ensures improved synchronous operation of the two sides of the pivoting mechanisms. The axle 72 is a common axle for the support rollers 60 on both sides, while at the same time stiffening the pivoting lever arrangement on both sides. The support rollers run inside the cut-out 36 and have conical side discs 61 on both sides which prevent the support rollers 60 from slipping off the control cams.

Several cross struts 70 may be provided between the control plates 34, and the articulations 23, 26 may be arranged on a common axis of cam mechanisms 12 arranged on both sides of the transport conveyor 2.

It is understood that the mechanism arrangement of the cam mechanism 12 may also be realized in kinematic inversion. It is important, however, that one single piston-cylinder unit 22 only is required for the operation of the cam mechanism 12, and that no additional locking devices are required for the two limit positions of the pivotable transport conveyor section 6.

What is claimed is:

1. A folding transport conveyor apparatus for a construction machine, comprising:
    a first transport conveyor section;
    a second transport conveyor section pivotally connected to the first transport conveyor section so that the second transport conveyor section articulates about a ground parallel axis relative to the first transport conveyor section;
    a conveyor belt extending around the first and second transport conveyor sections;
    at least one pivoting mechanism connected to the first and second transport conveyor sections, the pivoting mechanism including:
        a pivoting lever pivotally connected to the first transport conveyor section;

an actuator connected between the first transport conveyor section and the pivoting lever for pivoting the pivoting lever relative to the first transport conveyor section upon actuation of the actuator; and a cam mechanism including a control cam connected to one of the pivoting lever and the second transport conveyor section, and a coupling element interacting with the control cam, the coupling element being connected to the other of the pivoting lever and the second transport conveyor section.

2. The apparatus of claim 1, wherein:

the control cam is fixedly attached to said second transport conveyor section; and the coupling element is connected to the pivoting lever.

3. The apparatus of claim 2, wherein the coupling element pivots in a trajectory relative to the first transport conveyor section.

4. The apparatus of claim 3, wherein the trajectory comprises an arc of a circular path.

5. The apparatus of claim 1, wherein the pivoting lever comprises a first lever arm and a second lever arm projecting from the first lever arm at an angle, the pivoting lever being connected to the cam mechanism such that the pivoting lever pivots the second transport conveyor section relative to the first transport conveyor section via the cam mechanism upon actuation of the actuator.

6. The apparatus of claim 5, wherein the actuator is pivotally connected to the pivoting lever adjacent a bifurcation point between the first and second lever arms.

7. The apparatus of claim 1, wherein upon actuation of the actuator the coupling element acts upon the control cam of the cam mechanism to control pivoting movement of the second transport conveyor section relative to the first transport conveyor section.

8. The apparatus of claim 1, wherein the pivoting lever includes a free end and the coupling element is mounted upon the free end of the pivoting lever.

9. The apparatus of claim 1, wherein the cam mechanism includes a control plate and the control cam is incorporated in the control plate.

10. The apparatus of claim 1, wherein:

the cam mechanism includes a control plate and the control cam is defined by a cut-out in the control plate; and the coupling element is received in the cut-out and the coupling element engages the control cam to control the pivoting movement of the second transport conveyor section relative to the first transport conveyor section.

11. The apparatus of claim 1, wherein:

the control cam includes a plurality of cam sections, the plurality of cam sections including first and second detent positions, each of the detent positions defining a self-locking position of the second transport conveyor section relative to the first transport conveyor section.

12. A folding transport conveyor apparatus for a construction machine, comprising:

a first transport conveyor section;

a second transport conveyor section pivotally connected to the first transport conveyor section so that the second transport conveyor section articulates relative to the first transport conveyor section;

a conveyor belt extending around the first and second transport conveyor sections; and at least one pivoting mechanism connected to the first and second transport conveyor sections, the pivoting mechanism including a cam mechanism, the cam mechanism including a control cam connected to one of the first and second transport conveyor sections, and a coupling element interacting with the control cam, the coupling element being connected to the other of the first and second transport conveyor sections;

wherein the control cam includes a plurality of cam sections, the plurality of cam sections including first and second detent positions, each of the detent positions defining a self-locking position of the second transport conveyor section relative to the first transport conveyor section, the plurality of cam sections further including:

a first cam section including the first detent position for locking the second transport conveyor section in a working position relative to the first transport conveyor section;

a second cam section following the first cam section for lowering the second transport conveyor section relative to the first transport conveyor section;

a third cam section following the second cam section for moving the second transport conveyor section into a transport position relative to the first transport conveyor section; and a fourth cam section following the third cam section and including the second detent position for locking the second transport conveyor section in the transport position relative to the first transport conveyor section.

13. The apparatus of claim 12, wherein:

the pivoting mechanism comprises an actuator connected to the coupling element;

engagement of the coupling element with the first detent position of the first cam section locks the second transport conveyor section in the working position without requiring any other locking device;

engagement of the coupling element with the second detent position of the fourth cam section locks the second transport conveyor section in the transport position without requiring any other locking device; and the second transport conveyor section can only be moved from its transport position relative to the first transport conveyor section by actuation of the actuator to move the coupling element relative to the control cam.

14. The apparatus of claim 13, wherein:

the actuator comprises a piston-cylinder unit; and the cam sections of the control cam are designed such that forces in the piston-cylinder unit are minimized across an entire pivoting range of movement of the coupling element between the first and second detent positions.

15. The apparatus of claim 1, wherein:

the pivoting lever is a triangular shape pivoting lever.

16. The apparatus of claim 1, further comprising a second cam mechanism, the two cam mechanisms being connected to opposite sides of said one of the pivoting lever and the second transport conveyor section.

17. The apparatus of claim 1, wherein:

the pivoting lever includes a free end; and the coupling element includes a support roller rotatably mounted on the free end of the pivoting lever.

18. The apparatus of claim 1, wherein:

the pivoting mechanism is configured to pivot the second transport conveyor section from an extended position downwardly relative to the first transport conveyor section to a folded position wherein the second transport conveyor section is underneath the first transport conveyor section.

19. A folding transport conveyor apparatus for a construction machine including a machine frame and a milling drum supported from the machine frame, the apparatus comprising:
- a first transport conveyor section;
- a second transport conveyor section pivotally connected to the first transport conveyor section so that the second transport conveyor section articulates relative to the first transport conveyor section;
- one continuous conveyor belt extending around both the first and second transport conveyor sections so that there is no gap between the conveyor sections and granular material cut by the milling drum can be carried by the belt from the first transport conveyor section to the second transport conveyor section; and
- at least one pivoting mechanism connected to the first and second transport conveyor sections, the pivoting mechanism including a cam mechanism, the pivoting mechanism being configured to pivot the second transport conveyor section from an extended position downwardly relative to the first transport conveyor section to a folded position wherein the second transport conveyor section is underneath the first transport conveyor section.

\* \* \* \* \*